(12) United States Patent
Zhang et al.

(10) Patent No.: US 11,275,190 B2
(45) Date of Patent: Mar. 15, 2022

(54) GENERATING DIFFRACTION IMAGES BASED ON WAVE EQUATIONS

(71) Applicant: Saudi Arabian Oil Company, Dhahran (SA)

(72) Inventors: Dongliang Zhang, Khobar (SA); Tong Wang Fei, Dhahran (SA); Constantinos Tsingas, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 88 days.

(21) Appl. No.: 15/981,033

(22) Filed: May 16, 2018

(65) Prior Publication Data

US 2019/0353812 A1 Nov. 21, 2019

(51) Int. Cl.
*G01V 1/30* (2006.01)
*G01V 1/34* (2006.01)

(52) U.S. Cl.
CPC .............. *G01V 1/302* (2013.01); *G01V 1/345* (2013.01); *G01V 2210/48* (2013.01); *G01V 2210/642* (2013.01); *G01V 2210/646* (2013.01); *G01V 2210/675* (2013.01)

(58) Field of Classification Search
None
See application file for complete search history.

(56) References Cited

U.S. PATENT DOCUMENTS

| 493,339 A | 3/1893 | Phillips |
| 1,028,012 A | 5/1912 | Foster |
| 3,441,631 A | 4/1969 | Fernald et al. |
| 3,502,741 A | 3/1970 | Fernald et al. |
| 3,688,249 A | 8/1972 | Backus et al. |
| 3,691,529 A | 9/1972 | Pizante |

(Continued)

FOREIGN PATENT DOCUMENTS

| CN | 105093301 | 11/2015 |
| CN | 106154319 | 11/2016 |

(Continued)

OTHER PUBLICATIONS

Chen et al., "Directly imaging steeply-dipping fault zones in geothermal fields with multicomponent seismic data", Jul. 30, 2015, Geothermics 57, pp. 238-245 (Year: 2015).*

(Continued)

*Primary Examiner* — Brent A. Fairbanks
(74) *Attorney, Agent, or Firm* — Fish & Richardson P.C.

(57) ABSTRACT

A method of generating diffraction images based on wave equations includes generating a source wavefield and a receiver wavefield. Based on the source wavefield, a first source wavefield propagating in a first direction and a second source wavefield propagating in a second direction are generated. Based on the receiver wavefield, a first receiver wavefield propagating in the first direction and a second receiver wavefield propagating in the second direction are generated. A first seismic image is generated based on the first source wavefield and the first receiver wavefield. A second seismic image is generated based on the second source wavefield and the second receiver wavefield. A final seismic image is generated based on the first seismic image and the second seismic image.

15 Claims, 9 Drawing Sheets

(56) References Cited

U.S. PATENT DOCUMENTS

| | | | |
|---|---|---|---|
| 4,449,208 A | 5/1984 | Moeckel et al. | |
| 4,562,540 A | 12/1985 | Devaney | |
| 4,935,904 A | 6/1990 | Chambers et al. | |
| 5,292,837 A | 3/1994 | Heinrich et al. | |
| 6,767,975 B1 | 7/2004 | Liu | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 7,970,546 B1 | 6/2011 | Peng | |
| 8,116,168 B1 | 2/2012 | Luo et al. | |
| 8,209,125 B2 | 6/2012 | Berkovitch et al. | |
| 8,227,653 B2 | 7/2012 | Weber et al. | |
| 8,248,886 B2 | 8/2012 | Neelamani et al. | |
| 8,675,447 B2 | 3/2014 | Poole et al. | |
| 8,803,878 B2 | 8/2014 | Andersen et al. | |
| 8,948,463 B2 | 2/2015 | Landa et al. | |
| 9,116,255 B2 | 8/2015 | Eick et al. | |
| 9,128,205 B2 | 9/2015 | Guan et al. | |
| 9,536,143 B2 | 1/2017 | Jiang et al. | |
| 9,568,627 B2 | 2/2017 | Guigne et al. | |
| 9,575,194 B2 | 2/2017 | Khalil et al. | |
| 9,632,192 B2 | 4/2017 | Baina et al. | |
| 9,633,472 B2 | 4/2017 | Thomas et al. | |
| 9,651,694 B2 | 5/2017 | Zhang et al. | |
| 9,696,445 B2 | 7/2017 | Kluver et al. | |
| 9,702,997 B2 | 7/2017 | Sava et al. | |
| 9,715,027 B2 | 7/2017 | Gersztenkorn et al. | |
| 9,724,681 B2 | 8/2017 | Lucciulli et al. | |
| 9,726,771 B1 | 8/2017 | Popovici et al. | |
| 9,733,371 B2 | 8/2017 | Burnett et al. | |
| 9,766,357 B2 | 9/2017 | Cha | |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 10,022,698 B2 | 7/2018 | Shaik et al. | |
| 10,232,339 B2 | 3/2019 | Bischof et al. | |
| 10,280,125 B2 | 5/2019 | Sogo et al. | |
| 10,281,604 B2 | 5/2019 | Jing et al. | |
| 10,295,685 B2 | 5/2019 | Zhang et al. | |
| 10,310,113 B2 | 6/2019 | Sun et al. | |
| 10,310,122 B2 | 6/2019 | Haacke et al. | |
| 10,324,204 B1 | 6/2019 | Sturzu et al. | |
| 10,557,954 B2 | 2/2020 | Tonellot et al. | |
| 10,641,916 B2 | 5/2020 | Ozbek et al. | |
| 10,889,533 B2 | 1/2021 | Melibari et al. | |
| 10,928,533 B2 | 2/2021 | Ji et al. | |
| 10,935,680 B2 | 3/2021 | Tsingas et al. | |
| 11,029,431 B2 | 6/2021 | Zhang et al. | |
| 11,041,970 B2 | 6/2021 | Zhang et al. | |
| 2004/0152850 A1 | 8/2004 | Payer et al. | |
| 2005/0219949 A1 | 10/2005 | Taner et al. | |
| 2007/0203673 A1 | 8/2007 | Sherrill et al. | |
| 2008/0285383 A1 | 11/2008 | An | |
| 2010/0097888 A1 | 4/2010 | Neelamani et al. | |
| 2010/0114494 A1 | 5/2010 | Higginbotham et al. | |
| 2010/0131205 A1 | 5/2010 | Berkovitch et al. | |
| 2010/0171740 A1* | 7/2010 | Andersen | G06T 7/11 |
| | | | 345/424 |
| 2012/0016097 A1 | 1/2012 | Weber et al. | |
| 2012/0051176 A1* | 3/2012 | Liu | G01V 1/28 |
| | | | 367/38 |
| 2012/0300584 A1 | 11/2012 | Eick et al. | |
| 2012/0307591 A1 | 12/2012 | Hegna et al. | |
| 2013/0060476 A1 | 3/2013 | Thomson | |
| 2013/0077832 A1 | 3/2013 | Landa et al. | |
| 2013/0176819 A1* | 7/2013 | Poole | G01V 1/34 |
| | | | 367/38 |
| 2014/0032119 A1 | 1/2014 | Landa et al. | |
| 2014/0133275 A1 | 3/2014 | Guan et al. | |
| 2014/0149046 A1 | 5/2014 | Baina et al. | |
| 2014/0269183 A1 | 9/2014 | Kluver et al. | |
| 2014/0293744 A1 | 10/2014 | Zhang | |
| 2014/0321713 A1 | 10/2014 | Sava et al. | |
| 2014/0328140 A1 | 11/2014 | Khalil et al. | |
| 2015/0063066 A1 | 3/2015 | Burnett et al. | |
| 2015/0103623 A1* | 4/2015 | Gersztenkorn | G01V 1/307 |
| | | | 367/7 |
| 2015/0112601 A1 | 4/2015 | Ozbek | |
| 2015/0124559 A1 | 5/2015 | Cha et al. | |
| 2015/0170411 A1* | 6/2015 | Thomas | G16B 45/00 |
| | | | 345/420 |
| 2015/0203418 A1 | 7/2015 | Meiswinkel et al. | |
| 2015/0235081 A1 | 8/2015 | Jiang et al. | |
| 2015/0331123 A1 | 11/2015 | Guigne et al. | |
| 2016/0091624 A1* | 3/2016 | Haacke | G01V 1/308 |
| | | | 702/16 |
| 2016/0325274 A1 | 11/2016 | Schmidt | |
| 2016/0334526 A1 | 11/2016 | Pica | |
| 2016/0341837 A1 | 11/2016 | Eick | |
| 2016/0367977 A1 | 12/2016 | Shaikh et al. | |
| 2017/0001182 A1 | 1/2017 | Schmidt et al. | |
| 2017/0007994 A1 | 1/2017 | Lucciulli et al. | |
| 2017/0097428 A1* | 4/2017 | Sun | G01V 1/362 |
| 2017/0151547 A1 | 6/2017 | Shaik et al. | |
| 2017/0197892 A1 | 7/2017 | Khawaji | |
| 2018/0239041 A1 | 8/2018 | Tsingas et al. | |
| 2018/0292554 A1 | 10/2018 | Zhang et al. | |
| 2018/0327332 A1 | 11/2018 | Sogo et al. | |
| 2018/0345243 A1 | 12/2018 | Bischof et al. | |
| 2018/0356547 A1 | 12/2018 | Tonellot et al. | |
| 2019/0092707 A1 | 3/2019 | Melibari et al. | |
| 2019/0179044 A1 | 6/2019 | Zhang et al. | |
| 2019/0179045 A1 | 6/2019 | Zhang et al. | |
| 2020/0341160 A1 | 10/2020 | Ji et al. | |
| 2021/0063570 A1 | 3/2021 | Liu et al. | |
| 2021/0181364 A1 | 6/2021 | Zhang et al. | |
| 2021/0215842 A1 | 7/2021 | Liu et al. | |
| 2021/0278558 A1 | 9/2021 | Zhang et al. | |

FOREIGN PATENT DOCUMENTS

| | | |
|---|---|---|
| CN | 109307890 | 2/2019 |
| EP | 0109341 | 2/1991 |
| EP | 3029491 | 6/2016 |
| GB | 2483997 | 3/2012 |
| WO | WO2011154762 | 12/2011 |
| WO | WO 2013163131 | 10/2013 |
| WO | WO 2016156530 | 10/2016 |

OTHER PUBLICATIONS

Bahorich and Farmer, "3D Seismic Discontinuity for Faults and Stratigraphic Features: the Coherence Cube," The Leading Edge, vol. 14, 1995, 6 pages.

Chen et al., "Directly imaging steeply-dipping fault zones in geothermal fields with multicomponent seismic data," Geothermics vol. 57, Sep. 1, 2015, 31 pages.

Luo et al., "Edge-preserving smoothing and applications," The Leading Edge, vol. 21, 2002, 5 pages.

Zhang et al., "Efficient Wave-Equation-Based Diffraction Imagining," Geophysics, vol. 82, No. 5, Sep.-Oct. 2019, 11 pages.

PCT International Search Report and Written Opinion in International Appln. No. PCT/US2019/031421, dated Aug. 5, 2019, 17 pages.

Zhang et al., "Improving reverse time migration angle gathers by efficient wavefield separation". Geophysics, vol. 83, No. 2, Mar. 1, 2018 (Mar. 1, 2018), pp. S187-S195.

Fei et al., "An Endemic Problem in Reverse-Time Migration," 84th Annual International Meeting, SEG, Expanded Abstracts, Published in 2014, pp. 3811-3815.

Fei et al., "Removing False Images in Reverse-Time Migration: The Concept of De-Primary," Geophysics, vol. 80, No. 6, Nov.-Dec. 2015, pp, S237-S244.

Fletcher, "Suppressing Unwanted Internal Reflections in Prestack Reverse-Time Migration," Geophysics, vol. 71, No. 6, Nov.-Dec. 2006, pp. E79-E82.

Fomel, "Theory of 3-D Angle Gathers in Wave-Equation Imaging," 74th Annual International Meeting, SEG, Expanded Abstracts, Oct. 2004, pp. 1053-1056.

(56) References Cited

OTHER PUBLICATIONS

Forestiere et al., "Oligomerization of Monoolefins by Homogenous Catalysts", Oil & Science and Technology Review de l'Institute Francais du Petrole, vol. 64, No. 6, Nov. 2009, pp. 663-664, 20 pages.

Hu et al., "Angle gathers from reverse time migration using analytic wavefield propagation and decomposition in the time domain," Geophysics, vol. 81, No. 1, Jan. 1, 2016, 9 pages.

Khaidukov et al., "Diffraction imaging by focusing-defocusing: An outlook on seismic superresolution," Geophysics, vol. 69, No. 6, Nov.-Dec. 2004, 13 pages.

Kim et al., "3D Least-Squares Reverse Time Migration Using Wavefield Decomposition via Hilbert transform," 79th EAGE Conference & Exhibition, Jun. 12, 2017, 5 pages.

Klokov et al., "Separation and imaging of seismic diffractions using migrated dip-angle gathers," Geophysics, vol. 77, No. 6, S131-S143.

Kong et al., "Diffraction separation by plane-wave prediction filtering," Chinese Geophysical Society, Appl, Geophys. (2017) 14: 399, Jul. 2017.

Landa et al., "Separation, imaging and velocity analysis of seismic diffractions using migrated dip-anie gathers," 78th Annual International Meeting, SEG, Expanded Abstracts, 2008, 5 pages.

Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.

Liu et al., "An Effective Imaging Condition for Reverse-Time Migration using Wavefield Decomposition," Geophysics, vol. 76, No. 1, Jan. 2011, pp. S29-S39.

Liu et al., "Reverse-Time Migration using One-Way Wavefield Imaging Condition," 77th Annual International Meeting, SEG Expanded Abstracts, published in 2007, pp. 2170-2174.

Mahdaviani, et al., "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.

Popovici et al., "High resolution diffraction imaging of small scale fractures in shale and carbonate reservoirs," Unconventional Resources Technology Conference, 2015, 9 pages.

Qin et al., "Kirchhoff preSDM interactive dip-gather stacking and dip illumination panel generation," 75th Annual International Meeting, SEG, Expanded Abstracts, 2005, 5 pages.

Sava et al. "Angle-Domain Common Image Gathers by Wavefield Continuation Methods," Geophysics, 68, May-Jun. 2003, pp. 1065-1074.

Schoepp et al., "Multifocusing 3D diffraction imaging for detection of fractured zones in mudstone reservoirs: Case history," Interpretation 3(1), Feb. 2015, 12 pages.

Sun et al., "Comparative study of dip-angle domain Gaussian beam migration and Kirchhoff migration in diffraction separation," SEG Technical Program Expanded Abstracts, 2014, 5 pages.

Taner et al., "Separation and imaging of seismic diffractions using plane-wave decomposition," SEG Technical Program Expanded Abstracts, 25(1), Jan. 2006.

Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.

Xu et al., "3D Angle Gathers from Reverse-Time Migration," Geophysics, vol. 76, No. 2, Mar.-Apr. 2011, pp. S77-S92.

Zhang, "RTM Angle Gathers and Specular Filter (SF) RTM using Optical Flow," 84rd Annual International Meeting, SEG, Expanded Abstracts, Copyright 2014, pp. 3816-3820.

Gulf Cooperation Council Examination Report issued in GCC Appln. No. GC 2018-35094, dated Nov. 7, 2019, 4 pages.

PCT International Search Report and Written Opinion issued in International Appln. No. PCT/US2018/049834, dated Dec. 20, 2018, 17 pages.

PCT International Search Report and Written Opinion issued in International Appln. No. PCT/US2018/026071, dated Jul. 9, 2018, 15 pages.

Sturzu et al., "Diffraction imaging using specularity gathers," Journal Seismic Exploration vol. 23, Feb. 2014, 18 pages.

Zhang and Zhang, "Diffraction imaging using shot and opening angle gathers: A prestack time migration approach," Geophysics vol. 79, No. 2, Mar.-Apr. 2014, 11 pages.

Fei et al., "Removing false images in reverse time migration: The concept of de-primary," Geophysics vol. 80, No. 6, Nov.-Dec. 2015, 8 pages.

Zhang et al., "Improving RTM Angle Gathers by Efficient Wavefield Separation," Geophysics vol. 83, No. 2, Mar.-Apr. 2018, 10 pages.

Batany et al., "Adaptive multiple subtraction: Unification and Comparison of matching filters based on the Iq -norm and statistical independence," Geophysics vol. 81, No. 1, Jan.-Feb. 2016, 13 pages.

Berkhout and Verschuur, "Estimation of multiple scattering by iterative inversion, Part I: Theoretical considerations," Geophysics vol. 62, No. 5, Sep.-Oct. 1997, 10 pages.

Chen and Fomel, "Random noise attenuation using local signal-and-noise orthogonalization," Geophysics vol. 80, No. 6, WD1-WD9, 2015, 19 pages.

Donno, "Improving multiple removal using least-squares dip filters and independent component analysis," Geophysics vol. 76, No. 5, Sep.-Oct. 2011, 14 pages.

Donno et al., "Curvelet-based multiple prediction," Geophysics vol. 75, No. 6, Nov.-Dec. 2010, 9 pages.

Fomel, "Shaping regularization in geophysical-estimation problems," Geophysics vol. 72, No. 2, Mar.-Apr. 2007, 8 pages.

Guitton and Verschuur, "Adaptive subtraction of multiples using the L1-norm," Geophysical Prospecting, vol. 52, Issue 1, Jan. 2004, 12 pages.

Guitton, "Multiple attenuation in complex geology with a pattern-based approach," Geophysics vol. 70, No. 4, Jul.-Aug. 2005, 11 pages.

Herrmann et al., "Non-linear primary-multiple separation with directional curvelet frames," Geophysical Journal International vol. 170, Issue 2, Aug. 2007, 19 pages.

Kim et al., "Increasing signal-to-noise ratio of marine seismic data: a case study from offshore Korea," Journal of Applied Geophysics, vol. 134, Nov. 2016.

Li and Lu, "Demultiple strategy combining Radon filtering and Radon domain adaptive multiple subtraction," Journal of Applied Geophysics, vol. 103, Apr. 2014, 11 pages.

Rickett et al., "P167—Adaptive multiple subtraction with non-stationary helical shaping filters," EAGE 63rd Conference and Technical Exhibition, Jun. 11-15, 2001, 4 pages.

Spitz, "Pattern recognition, spatial predictability and subtraction of multiple events," the Leading Edge, Jan. 1999, 4 pages.

Ventosa et al., "Adaptive multiple subtraction with wavelet-base complex urary Wiener filters," Jun. 2018, published in Geophysics vol. 77, Nov.-Dec. 2012, 18 pages.

Verschuur et al., "Adaptive surface-related multiple elimination," Geophysics vol. 57, No. 9, Sep. 1992, 12 pages.

Wang, "Multiple subtraction using an expanded multichannel matching filter," Geophysics vol. 68, No. 1, Jan.-Feb. 2003, 9 pages.

Wiggins, "Multiple attenuation by explicit wave extrapolation to an interpreted horizon," the Leading Edge, Jan. 1999, 7 pages.

Xue et al., "Amplitude-perserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.

Gulf Cooperation Council Examination Report issued in GCC Appln. No. GC 2018-35094 dated Mar. 4, 2020, 3 pages.

Liu et al., "Imaging diffractors using wave-equation migration," Geophysics, vol. 81, No. 6, Nov.-Dec. 2016, 10 pages.

Zhang et al., "RTM angle gathers by optical flow with wavefield separation", SEG Technical Program Expanded Abstracts 2018, Aug. 27, 2018, 5 pages.

GCC Examination Report in GCC Appln. No. GC 2019-37569, dated Jun. 29, 2020, 4 pages.

(56) References Cited

OTHER PUBLICATIONS

Wang et al., "RTM Artifact Removal Via a Fast Algorithm for Wavefield Decomposition," 2016 SEG International Exposition and 86th Annual Meeting, 2016, 5 pages.

PCT International Search Report and Written Opinion in International Appln. No. PCT/US2020/064511, dated Apr. 1, 2021, 17 pages.

Wang et al., "Reverse Time Migration with Hilbert Transform Based Full Wavefield Decomposition" Chinese Journal of Geophysics-Chinese Edition 59.11, Nov. 2016. 4200-4211, 12 pages.

Zhong et al., "Reverse Time Migration of Ground-Penetrating Radar with Full Wavefield Decomposition Based on the Hilbert Transform" Geophysical Prospecting 68.4, Apr. 2020, 1097-1112, 16 pages.

Gong et al., "Polarized Wavefield Magnitudes with Optical Flow for Elastic Angle-Domain Common-Image Gathers," Geophysics, Jul.-Aug. 2016, 81(4):S239-S251.

Dafni et al., "Diffraction imaging by prestack reverse-time migration in the dip angle domain: diffraction imaging by reverse-time migration," Geophysical Prospecting, Oct. 2017, 65(14):295-316.

PCT International Search Report and Written Opinion in International Appln. No. PCT/US2020/049045, dated Dec. 15, 2020, 19 pages.

CN Office action in Chinese Appln. No. 201880037535.2, dated Apr. 30, 2021, 21 pages (With English Translation).

He et al., "Reflection waveform inversion with variable density." Journal of Applied Geophysics 170, 103827, Nov. 2019, 16 pages.

PCT International Search Report and Written Opinion in International Appln. No. PCT/US2021/012193, dated Apr. 20, 2021, 18 pages.

GCC Examination Report in GCC Appln. No. GC 2019-37569, dated Nov. 24, 2020, 5 pages.

GCC Examination Report in GCC Appln. No. GC 2019-37569, dated Jun. 6, 2021, 4 pages.

PCT International Search Report and Written Opinion in International Appln. No. PCT/US2021/021484, dated Jun. 24, 2021, 13 pages.

\* cited by examiner

GENERATING DIFFRACTION IMAGES BASED ON WAVE EQUATIONS

TECHNICAL FIELD

This disclosure relates to seismic data processing.

BACKGROUND

Seismic data can be collected for a target region including one or more earth subsurface layers by sending seismic waves to the target region at multiple source locations and recording received waves at multiple receiver locations. The seismic data can be used to build seismic images for analyzing subsurface structure or lithology of the target region so that effective oil and gas exploration can be performed.

SUMMARY

The present disclosure describes methods for generating a diffraction image based on wave equations.

In an implementation, a source wavefield and a receiver wavefield are generated. Based on the source wavefield, a first source wavefield propagating in a first direction and a second source wavefield propagating in a second direction are generated. Based on the receiver wavefield, a first receiver wavefield propagating in the first direction and a second receiver wavefield propagating in the second direction are generated. A first seismic image is generated based on the first source wavefield and the first receiver wavefield. A second seismic image is generated based on the second source wavefield and the second receiver wavefield. A final seismic image is generated based on the first seismic image and the second seismic image.

The subject matter described in this specification can be implemented to realize one or more of the following advantages. The described approach provides an efficient and practical technique for generating a diffraction image based on wave equations. A diffraction image includes information of diffractors in the earth subsurface that represent potential locations for oil and gas. The described approach can generate high-resolution diffraction images at a reduced computational cost, and make diffraction imaging affordable particularly for 3D seismic imaging. The high-resolution diffraction images enable efficient oil and gas exploration, for example, efficiently identifying locations for hydrocarbon wells and determining drilling parameters for the hydrocarbon wells.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DESCRIPTION OF DRAWINGS

Like reference numbers and designations in the various drawings indicate like elements.

DETAILED DESCRIPTION

Figure 1:
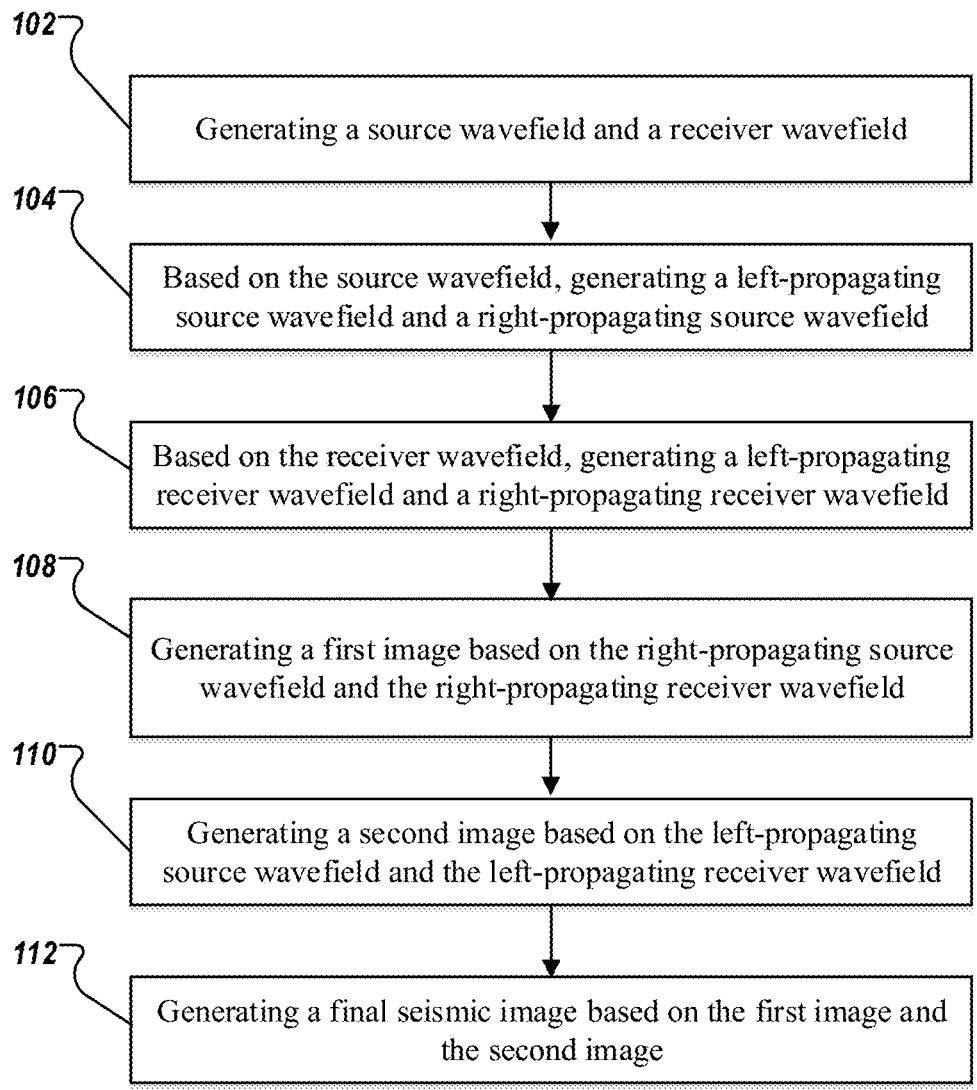
FIG. 1 is a flowchart illustrating an example of a computer-implemented method for generating a diffraction image, according to some implementations of the present disclosure.

The following detailed description describes methods for generating a diffraction image based on wave equations. This disclosure is presented to enable any person skilled in the art to make and use the disclosed subject matter in the context of one or more particular implementations. Various modifications, alterations, and permutations of the disclosed implementations can be made and will be readily apparent to those of ordinary skill in the art. The general principles defined in this disclosure can be applied to other implementations and applications without departing from the scope of the disclosure. Thus, the present disclosure is not intended to be limited to the described or illustrated implementations, but is to be accorded the widest scope consistent with the principles and features disclosed in this disclosure.

A seismic source can be used to generate seismic waves propagating into the earth subsurface. Seismic waves can be reflected and diffracted by reflectors and diffractors in the earth subsurface. Reflectors refer to geologic continuities in the subsurface. For example, a continued flat boundary between two subsurface layers is a reflector. Diffractors refer to geologic discontinuities in the subsurface. For example, a diffractor can be a fault surface, a fracture zone, an isolated scatter, a reflector edge, or an erosional surface. Diffractors can indicate potential locations for oil and gas. The reflected and diffracted waves from the subsurface layers can be recorded by receivers. The recorded waves (or recorded seismic data) can be processed to generate seismic images, such as diffraction images. Diffraction images provide information of diffractors.

Diffraction images can be generated by methods based on a ray theory or wave equations. Wave-equation-based methods can provide high-resolution diffraction images. However, due to the high computational costs associated with the wave-equation-based methods, most existing methods of generating diffraction images are based on the ray theory. The described approach provides an efficient and practical wave-equation-based technique for generating a diffraction image at a reduced computational cost.

The described approach generates a diffraction image by decomposing source and receiver wavefields (as discussed later, source and receiver wavefields describe wave propagation in the earth subsurface) into two opposite propagating directions, for example, left and right. The left-propagating source wavefield and the left-propagating receiver wavefield generates a first image, and the right-propagating source wavefield and the right-propagating receiver wavefield generates a second image. The final diffraction image is generated by multiplying the first image and the second image. The described approach is based on the fact that a reflector has a particular (specular) dip direction. Therefore, a reflector is either in the first or the second image, but not both. On the other hand, a diffractor can bounce seismic waves in all directions ranging from −90° to 90°. Therefore, a diffractor is in both images. After multiplying the two images, the diffractors remain while the reflectors are suppressed.

FIG. 1 is a flowchart illustrating an example of a computer-implemented method 100 for generating a diffraction image, according to some implementations of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

Although the description of method 100 generates a two-dimensional (2D) diffraction image (a cross-section image of a three-dimensional (3D) subsurface by cutting the 3D subsurface by a plane parallel to an axis indicating depth), as understood by one of ordinary skill in the art, method 100 can be extended to generate a 3D diffraction image. For example, method 100 can be used to generate 2D diffraction images of multiple parallel cross sections of the 3D subsurface, and the multiple 2D images can be combined to form a 3D diffraction image.

In a seismic survey, source waves can be sent from multiple source locations to the earth subsurface, and returned waves from the subsurface can be recorded by multiple receivers at different locations. For example, a source device at a first source location sends a first source wave to the earth subsurface, and the multiple receivers record the returned waves. The source device then moves to a second source location and sends a second source wave, and the multiple receivers record the corresponding returned waves. The source and receiver locations can be on the earth surface.

In FIG. 1, at 102, for a particular source location, a source wavefield and a receiver wavefield are generated. The source wavefield describes wave propagation in the earth subsurface caused by the source signal transmitted at the particular source location. In some cases, the source signal is known or can be estimated. A subsurface velocity model describing wave propagation velocities in the subsurface can also be estimated. Given the source signal at the particular source location and the subsurface velocity model, a wave equation (a mathematical equation that describes wave propagation based on physics laws) can be solved to generate (simulate or model) the source wavefield. The receiver wavefield describes wave propagation in the earth subsurface caused by the signals received at all receiver locations due to the source signal transmitted at the particular source location. In other words, for the particular source location, the corresponding receiver wavefield is derived by assuming that the waves recorded at all the receivers due to the source signal from the particular source location are simultaneously back-propagated in time and space from the respective receiver location to the earth subsurface. Similar to the generation of the source wavefield, the receiver wavefield can be generated by solving a wave equation assuming that the transmitted signals are the recorded waves at the receiver locations.

In sum, for each source location, a source wavefield and a receiver wavefield can be generated. The source and receiver wavefields are a function of time and space (the wavefield describes the propagating waveform at each spatial location in the subsurface as a function of time). For example, for a 2D subsurface defined by a depth axis z (a down-going axis indicating depth) and a spatial axis x (an axis perpendicular to z), the source and receiver wavefields are a function of z, x, and time t. From 102, method 100 proceeds to 104.

At 104, the source wavefield is decomposed into two different propagation directions. The two propagation directions can be two opposite directions, for example, left and right directions. For a 2D subsurface defined by the depth axis z and the spatial axis x, the left and right directions can be the two opposite directions perpendicular to the depth axis z. By applying Hilbert transform with respect to z, x, or time t, the source wavefield (denoted as S) can be decomposed into a first source wavefield propagating in the left direction (also called left-propagating source wavefield and denoted as $S_l$) and a second source wavefield propagating in the right direction (also called right-propagating source wavefield and denoted as $S_r$). The right-propagating source wavefield $S_r$ can be expressed as $$S_r = \tfrac{1}{8}\{S - H_{tz}(S) - H_{tx}(S) - H_{xz}(S) + i[H_t(S) + H_z(S) + H_x(S) - H_{tzx}(S)]\}, \quad (1)$$

where H denotes the Hilbert transform, the subscripts t, z, and x represent the directions in which the Hilbert transform is applied, and i is the imaginary number. The left-propagating source wavefield $S_l$ can be expressed as $$S_l = \tfrac{1}{8}\{S - H_{tz}(S) + H_{tx}(S) + H_{xz}(S) + i[H_t(S) + H_z(S) - H_x(S) + H_{tzx}(S)]\}. \quad (2)$$

Note that S, $S_r$, $S_l$ are functions in time and space, that is, functions of t, x, and z. From 104, method 100 proceeds to 106.

At 106, the receiver wavefield (denoted as R) is decomposed into two propagation directions same as those of the source wavefield. The right-propagating receiver wavefield, denoted as $R_r$, can be expressed as $$R_r = \tfrac{1}{8}\{R - H_{tz}(R) - H_{tx}(R) - H_{xz}(R) + i[H_t(R) + H_z(R) + H_x(R) - H_{tzx}(R)]\}, \quad (3)$$

and the left-propagating receiver wavefield, denoted as $R_l$, can be expressed as $$R_l = \tfrac{1}{8}\{R - H_{tz}(R) + H_{tx}(R) + H_{xz}(R) + i[H_t(R) + H_z(R) - H_x(R) + H_{tzx}(R)]\}. \quad (4)$$

Note that R, $R_r$, $R_l$ are functions in time and space, that is, functions of t, x, and z. From 106, method 100 proceeds to 108.

At 108, a first image of the subsurface is generated by applying an imaging condition to the right-propagating source wavefield $S_r$ and the right-propagating receiver wavefield $R_r$. The imaging condition is the inner product of the two wavefields. For example, the first image, denoted as $I_{rr}$ and also called right-right image, can be generated using $S_r$ and $R_r$ in Equations (1) and (2) and expressed as $$I_{rr} = Re\left\{\int_0^{T_{max}} S_r R_r dt\right\} = \frac{1}{64}\int_0^{T_{max}} \{[S - H_{tz}(S) - H_{tx}(S) - H_{xz}(S)] \quad (5)$$
$$[R - H_{tz}(R) - H_{tx}(R) - H_{xz}(R)] -$$
$$[H_t(S) + H_z(S) + H_x(S) - H_{tzx}(S)]$$
$$[H_t(R) + H_z(R) + H_x(R) - H_{tzx}(R)]\}dt,$$

where Re{ } represents the real part, $T_{max}$ is the maximum recording time when the receivers record the returned waves from the subsurface. By performing the integral with respect to the time t, the first image $I_{rr}$ becomes a function of space (a function of z and x). The first image $I_{rr}$ includes information of the positive dip structure of the subsurface. The positive dip structure includes positive dip reflectors and diffractors. The negative dip structure includes negative dip reflectors and diffractors. The positive dip structure includes reflectors with a positive dip and having a negative tan(dx/dz). The negative dip structure includes reflectors with a negative dip and having a positive tan(dx/dz). Note that the down-going direction is the positive direction of the depth axis z. From 108, method 100 proceeds to 110.

At 110, similar to 108, a second image of the subsurface is generated by applying the image condition to the left-propagating source wavefield $S_l$ and the left-propagating receiver wavefield $R_l$. For example, the second image, denoted as $I_{ll}$ and also called left-left image, can be generated using $S_l$ and $R_l$ in Equations (3) and (4) and expressed as $$I_{ll} = Re\left\{\int_0^{Tmax} S_l R_l dt\right\} = \frac{1}{64}\int_0^{Tmax} \{[S - H_{tz}(S) + H_{tx}(S) + H_{xz}(S)]$$

$$[R - H_{tz}(R) + H_{tx}(R) + H_{xz}(R)] -$$

$$[H_t(S) + H_z(S) - H_x(S) + H_{tzx}(S)]$$

$$[H_t(R) + H_z(R) - H_x(R) + H_{tzx}(R)]\}dt.$$

The second image $I_{ll}$ is a function of space (a function of z and x), and includes information of negative dip structure of the subsurface. From 110, method 100 proceeds to 112.

For generating a diffraction image, the different physical properties of diffracted versus reflected wave propagation are used. Diffracted waves propagate along all directions (all angles) whereas reflected waves propagate along limited directions (limited angles or specular reflections). Therefore, due to the fact that same diffractors and opposite dip reflectors exist in the two images $I_{rr}$ and $I_{ll}$, a sample-by-sample multiplication of the two images can enhance the diffracted energy and suppress the reflected energy to provide a diffraction image. In other words, a diffractor appears in both $I_{rr}$ and $I_{ll}$, while a reflector appears in either $I_{rr}$ or $I_{ll}$, but not both. For example, at a particular position (x,z), $I_{rr}$ can indicate a reflector and has a great value, and $I_{ll}$ has a value close to zero since the reflector is not included in $I_{ll}$. As a result, by multiplying $I_{rr}$ and $I_{ll}$ sample-by-sample (that is, for each position (x,z), multiplying corresponding values of $I_{rr}$ and $I_{ll}$), the final image includes diffractors but not reflectors. An exception case occurs when the reflectors are at zero dip, such reflectors could be imaged in both images $I_{rr}$ and $I_{ll}$, and thus leak in the final diffractor image. This problem can be overcome simply by omitting the zero-offset input data.

As discussed earlier, for each source location a source wavefield and a receiver wavefield can be determined, and then a pair of images $I_{rr}$ and i can be generated using Equations (1)-(6). In some cases, an improved $I_{rr}$ can be generated by summing $I_{rr}$'s from different source locations for a greater signal-to-noise ratio. Similarly, an improved i can be generated by summing $I_{ll}$'s from different source locations. An improved diffraction image can be generated by sample-by-sample multiplying the improved $I_{ll}$ and the improved $I_{rr}$.

At 112, a diffraction image can be generated by sample-by-sample multiplying the pair of $I_{rr}$ and $I_{ll}$ corresponding to a source location (for each position (x,z), multiplying corresponding values of $I_{rr}$ and $I_{ll}$). In some cases, an improved diffraction image $I_{diff}$ is generated by sample-by-sample multiplying the improved $I_{rr}$ and the improved $I_{ll}$ and expressed as:

$$i_{diff} = \left(\sum_i I_{rr,i}\right)\left(\sum_i I_{ll,i}\right) \quad (7)$$

where $I_{rr,i}$ and $I_{ll,i}$ are the right-right image and the left-left image for the ith source location, respectively, $\Sigma_i I_{rr,i}$ and $\Sigma_i I_{ll,i}$ are the improved $I_{rr}$ and the improved $I_{ll}$, respectively, and $I_{diff}$ is the improved diffraction image including diffractor information. When calculating Equation (7), for each position (x,z), values of the improved $I_{rr}$ and the improved $I_{ll}$ are multiplied. In some cases, the diffraction image can be displayed on a user interface. The diffraction image can be used to identify locations for hydrocarbon wells and determine drilling parameters for the drilling equipment to drill hydrocarbon wells. The locations for the hydrocarbon wells and the drilling parameters can be displayed on a user interface. In some cases, the drilling parameters can be transmitted to the drilling equipment. From 112, method 100 stops.

Figure 2A:
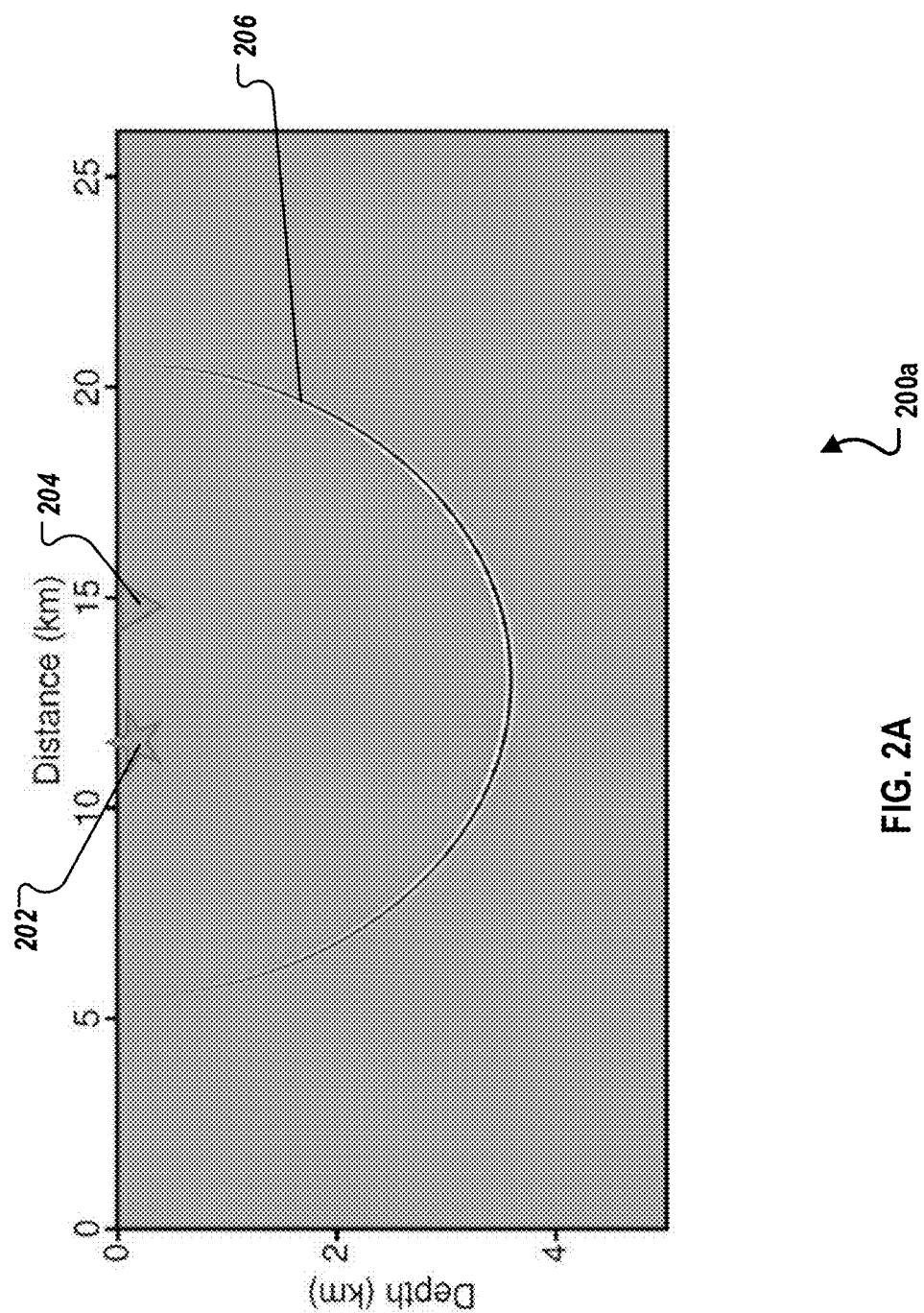
FIGS. 2A-2C illustrate an impulse response test that was conducted to verify the described approach, according to some implementations of the present disclosure.
Figure 2B:
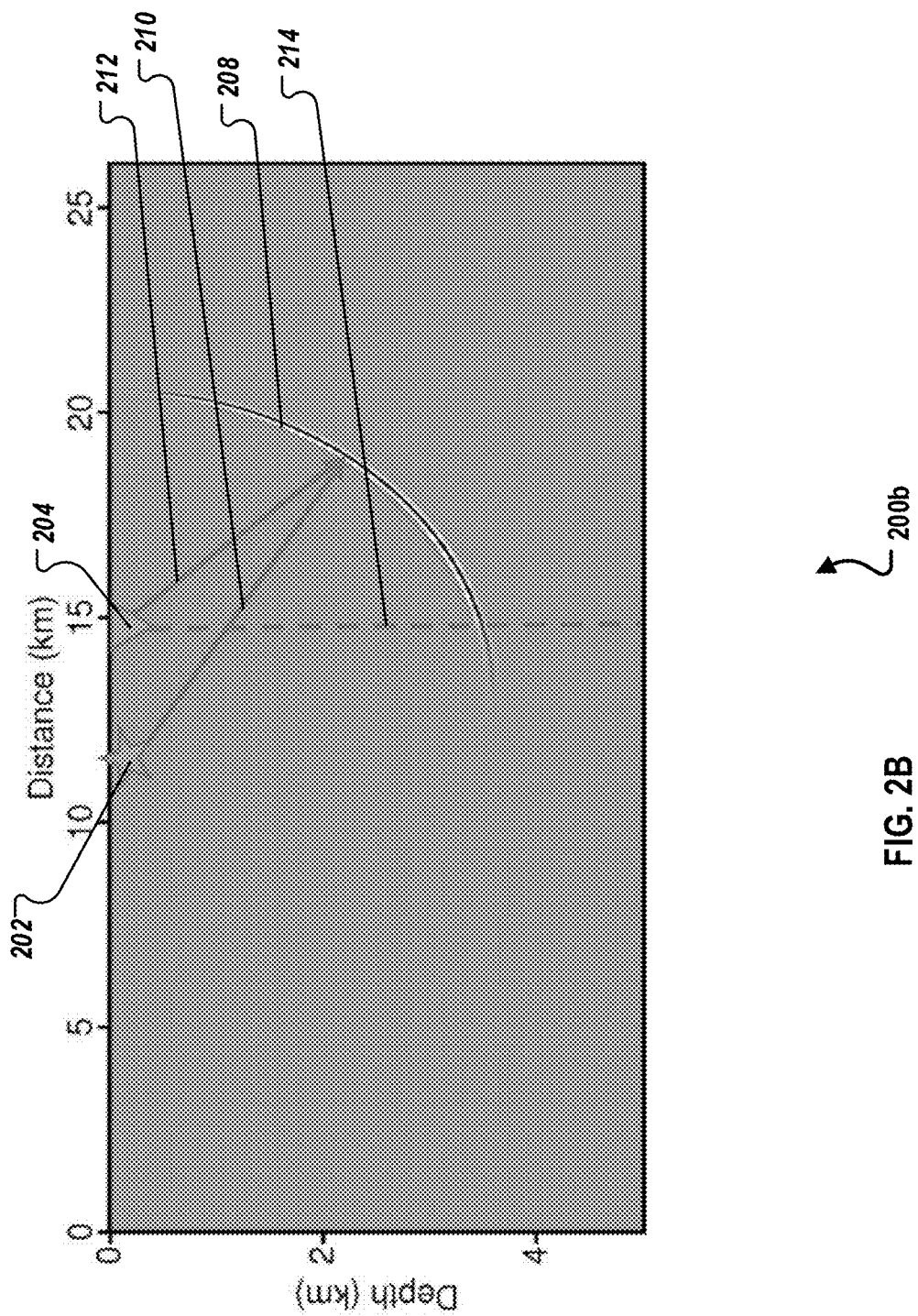
Figure 2C:
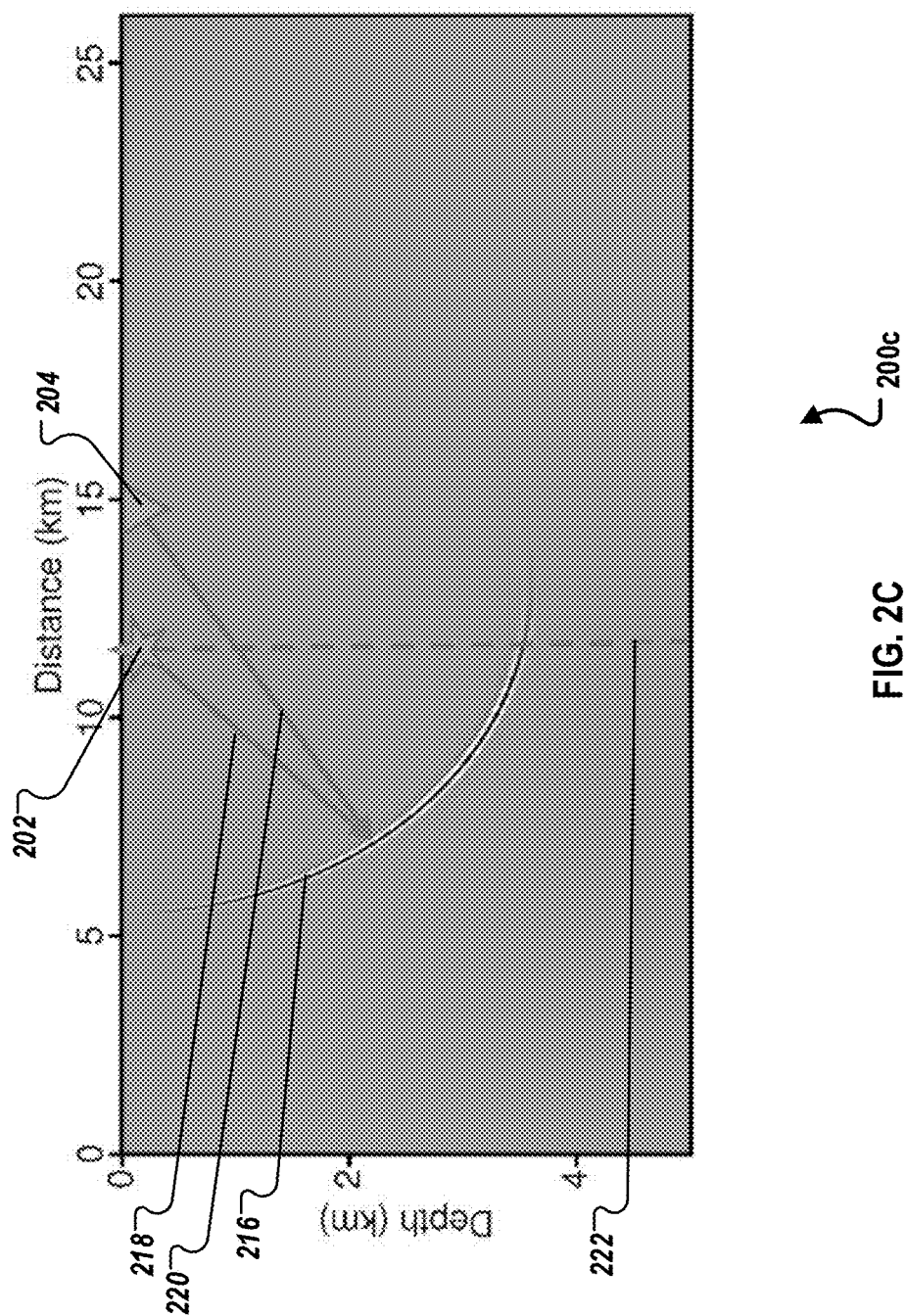

FIGS. 2A-2C illustrate an impulse response test that was conducted to verify the described approach, according to some implementations of the present disclosure. In FIGS. 2A-2C, the horizontal axis represents a distance in kilometer (km), and the vertical axis represents a depth in kilometer (km). FIG. 2A shows an image 200a including a full impulse response of a conventional wave-equation-based migration using one source location and one receiver location with one wavelet signal. The star 202 indicates the source location, and the inverse triangle 204 indicates the receiver location. The half oval shape 206 is an image of a subsurface boundary.

FIG. 2B shows an image 200b including the impulse response of the positive dip 208 by using the right-right imaging condition Equation (5). The arrows 210 and 212 indicate the right propagation directions excited from the source location 202 and the receiver location 204. In FIG. 2B, only the area to the right side of the receiver location 204 (the right side of the dash line 214) is imaged.

FIG. 2C shows an image 200c including the impulse response of the negative dip 216 by using the left-left imaging condition Equation (6). The arrows 218 and 220 indicate the left propagation directions excited from the source location 202 and the receiver location 204. In FIG. 2C, only the area to the left side of the source location 202 (the left side of the dash line 222) is imaged.

Figure 3:
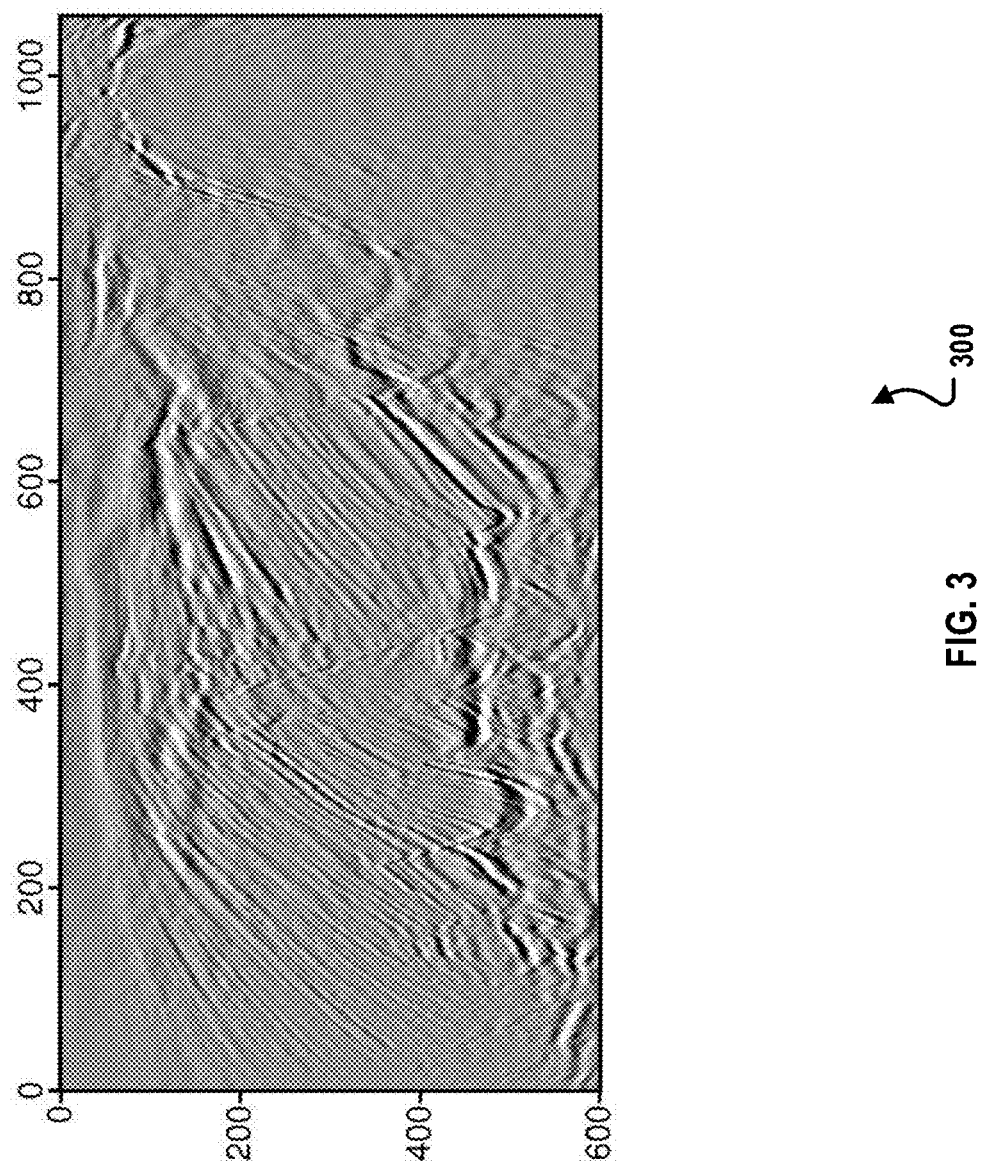
FIGS. 3-6 illustrate results of using a conventional wave-equation-based imaging technique and the described approach on real filed data, according to some implementations of the present disclosure.
Figure 4:
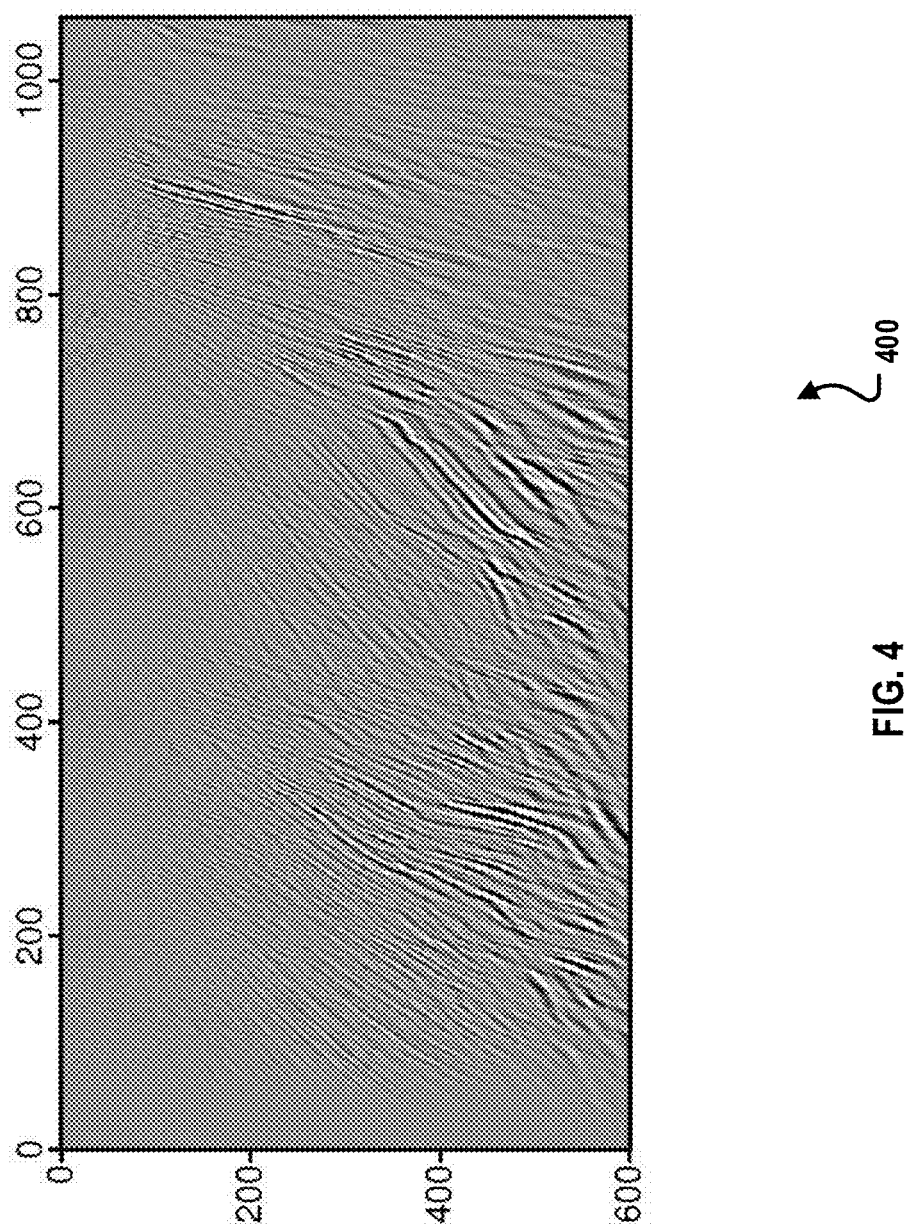
Figure 5:
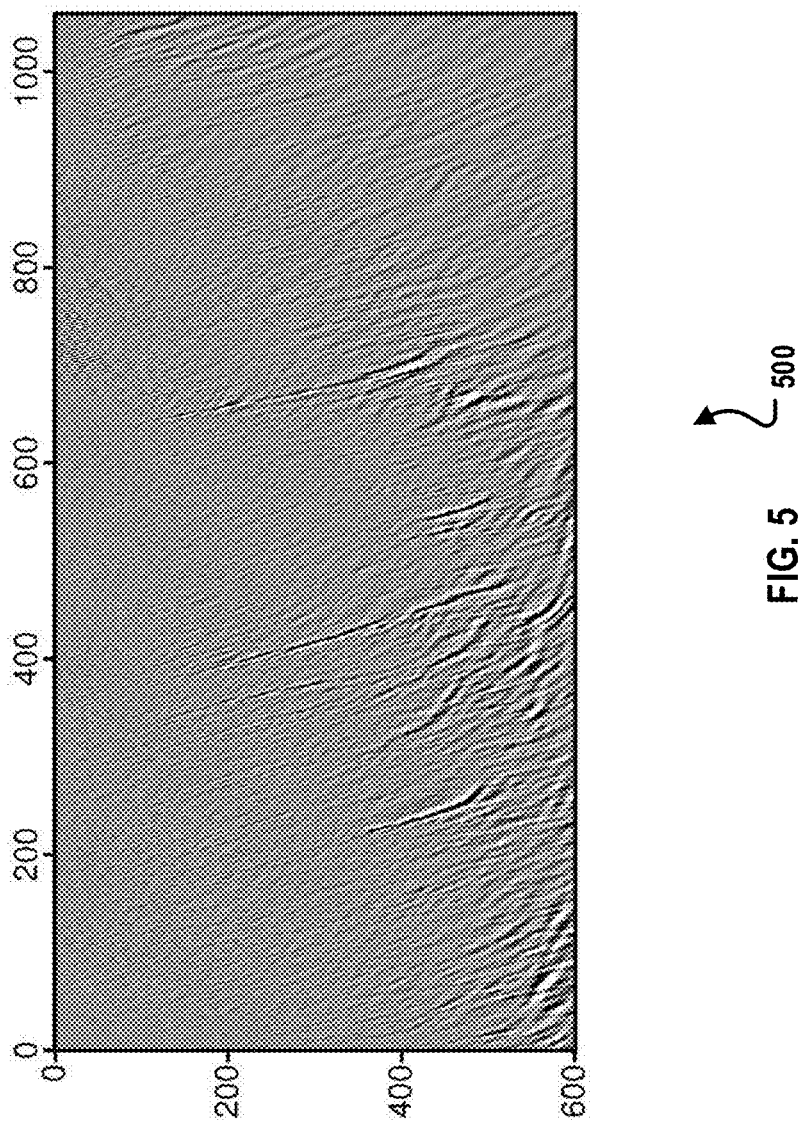
Figure 6:
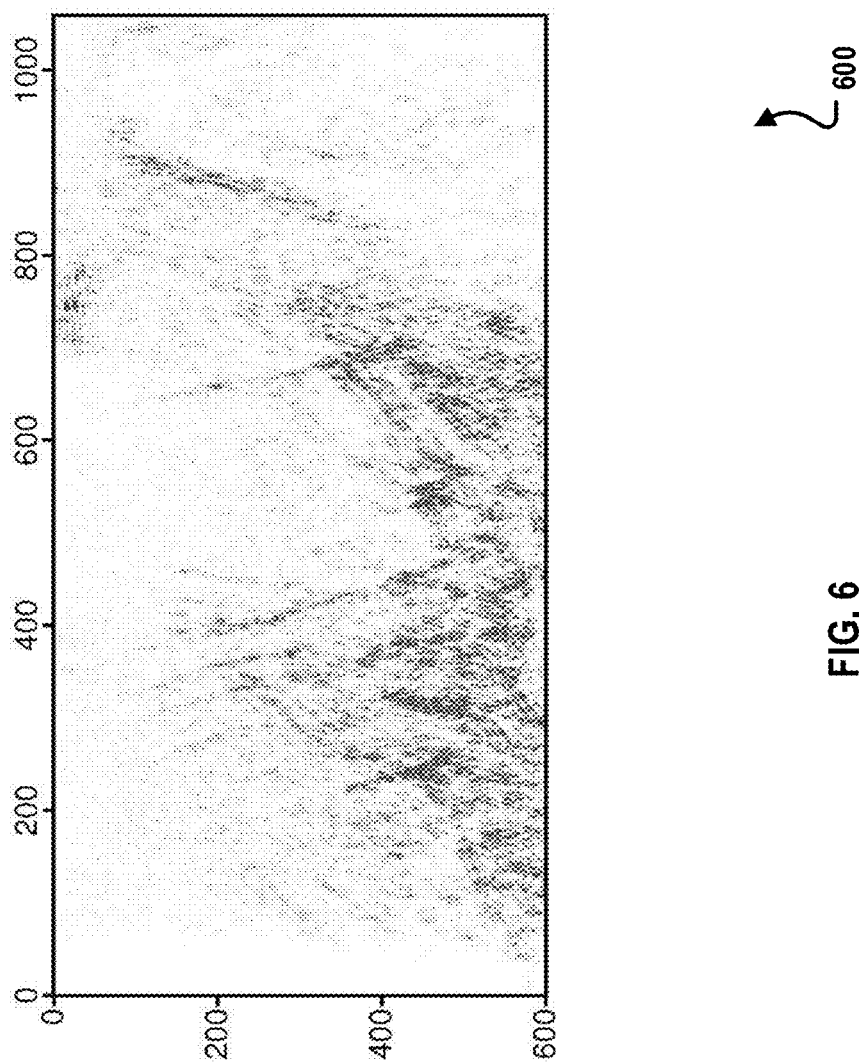

FIGS. 3-6 illustrate results of using a conventional wave-equation-based imaging technique and the described approach on real filed data, according to some implementations of the present disclosure. In FIGS. 3-6, the horizontal axis represents a distance, and the vertical axis represents a depth. FIG. 3 shows a migration image 300 obtained by using a conventional wave-equation-based imaging technique. The image 300 includes information of both reflectors and diffractors (both reflection and diffraction seismic events). FIG. 4 shows a migration image 400 using the right-right imaging condition Equation (5), and FIG. 5 shows a migration image 500 using the left-left imaging condition Equation (6). The image 400 shows the positive dip structure while the image 500 shows the negative dip structure. FIG. 6 shows a diffraction image 600 by multiplying the images 400 and 500. Compared with the image 300, the image 600 clearly indicates the location of diffractors such as faults.

Figure 7:
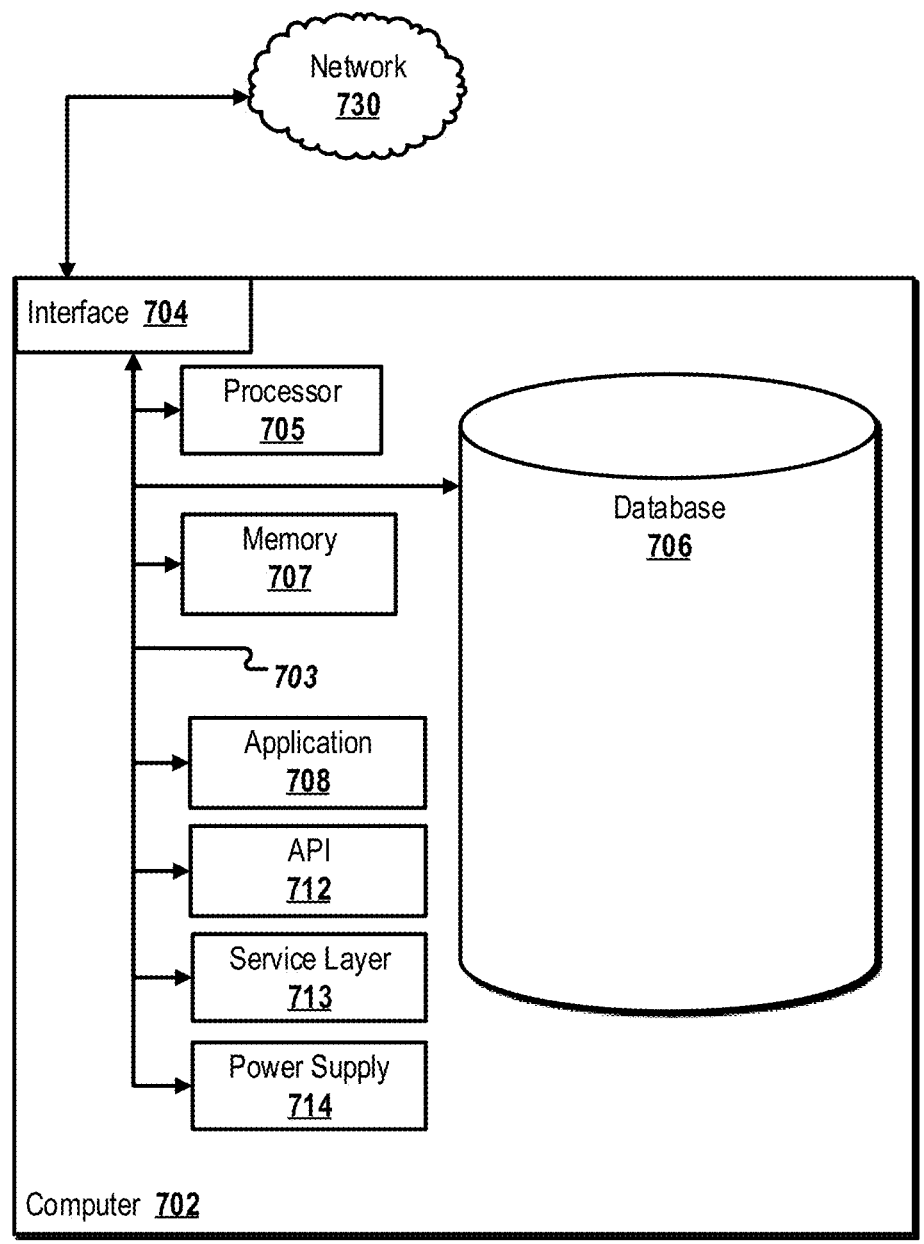
FIG. 7 is a block diagram illustrating an example of a computer-implemented system used to provide computational functionalities associated with described algorithms, methods, functions, processes, flows, and procedures, according to some implementations of the present disclosure.

FIG. 7 is a block diagram illustrating an example of a computer-implemented system 700 used to provide computational functionalities associated with described algorithms, methods, functions, processes, flows, and procedures, according to some implementations of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 702 can include an input device, such as a keypad, keyboard, touch screen, or a combination of input devices that can accept user information, and an output device that conveys information associated with the operation of the computer 702 (for example, conveying digital data, visual, audio, or a combination of types of information on a graphical-type user interface (UI) (or GUI) or other UI).

The computer 702 can serve in a role in a distributed computing system as a client, network component, a server, a database, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using the service layer 713. Software services, such as those provided by the service layer 713, provide reusable, defined functionalities through a defined interface. For example, the interface can be software written in JAVA, C++, or a combination of computing languages providing data in extensible markup language (XML) format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or hardware of interface 704 is operable to communicate physical signals within and outside of the illustrated computer 702.

The computer 702 includes a processor 705. Although illustrated as a single processor 705, two or more processors 705 can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory or conventional database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. The memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method includes generating a source wavefield and a receiver wavefield. Based on the source wavefield, a first source wavefield propagating in a first direction and a second source wavefield propagating in a second direction are generated. Based on the receiver wavefield, a first receiver wavefield propagating in the first direction and a second receiver wavefield propagating in the second direction are generated. A first seismic image is generated based on the first source wavefield and the first receiver wavefield. A second seismic image is generated based on the second source wavefield and the second receiver wavefield. A final seismic image is generated based on the first seismic image and the second seismic image.

The foregoing and other described implementations can each, optionally, include one or more of the following features:

A first feature, combinable with any of the following features, where the first source wavefield is generated by applying a Hilbert transform on the source wavefield.

A second feature, combinable with any of the previous or following features, where the final seismic image is generated by sample-by-sample multiplying the first seismic image and the second seismic image.

A third feature, combinable with any of the previous or following features, where the source wavefield and the receiver wavefield represent wave propagation for a first source location.

A fourth feature, combinable with any of the previous or following features, where the method further includes generating a second source wavefield and a second receiver wavefield for a second source location. Based on the second source wavefield, a third source wavefield propagating in the first direction and a fourth source wavefield propagating in the second direction are generated. Based on the second receiver wavefield, a third receiver wavefield propagating in the first direction and a fourth receiver wavefield propagating in the second direction are generated. A third seismic image is generated based on the third source wavefield and the third receiver wavefield. A fourth seismic image is generated based on the fourth source wavefield and the fourth receiver wavefield. A second final seismic image is generated based on the first, second, third, and fourth seismic images.

A fifth feature, combinable with any of the previous or following features, where the final seismic image is a diffraction image indicating discontinuities in an earth subsurface.

A sixth feature, combinable with any of the previous features, where the method further includes displaying the final seismic image. Based on the final seismic image, locations for hydrocarbon wells are determined and drilling parameters for the hydrocarbon wells are determined. The locations for the hydrocarbon wells and the drilling parameters are displayed.

In a second implementation, a non-transitory, computer-readable medium stores one or more instructions executable by a computer system to perform operations including generating a source wavefield and a receiver wavefield. Based on the source wavefield, a first source wavefield propagating in a first direction and a second source wavefield propagating in a second direction are generated. Based on the receiver wavefield, a first receiver wavefield propagating in the first direction and a second receiver wavefield propagating in the second direction are generated. A first seismic image is generated based on the first source wavefield and the first receiver wavefield. A second seismic image is generated based on the second source wavefield and the second receiver wavefield. A final seismic image is generated based on the first seismic image and the second seismic image.

The foregoing and other described implementations can each, optionally, include one or more of the following features:

A first feature, combinable with any of the following features, where the first source wavefield is generated by applying a Hilbert transform on the source wavefield.

A second feature, combinable with any of the previous or following features, where the final seismic image is generated by sample-by-sample multiplying the first seismic image and the second seismic image.

A third feature, combinable with any of the previous or following features, where the source wavefield and the receiver wavefield represent wave propagation for a first source location.

A fourth feature, combinable with any of the previous or following features, where the operations further include generating a second source wavefield and a second receiver wavefield for a second source location. Based on the second source wavefield, a third source wavefield propagating in the first direction and a fourth source wavefield propagating in the second direction are generated. Based on the second receiver wavefield, a third receiver wavefield propagating in the first direction and a fourth receiver wavefield propagating in the second direction are generated. A third seismic image is generated based on the third source wavefield and the third receiver wavefield. A fourth seismic image is generated based on the fourth source wavefield and the fourth receiver wavefield. A second final seismic image is generated based on the first, second, third, and fourth seismic images.

A fifth feature, combinable with any of the previous or following features, where the final seismic image is a diffraction image indicating discontinuities in an earth subsurface.

A sixth feature, combinable with any of the previous features, where the operations further include displaying the final seismic image. Based on the final seismic image, locations for hydrocarbon wells are determined and drilling parameters for the hydrocarbon wells are determined. The locations for the hydrocarbon wells and the drilling parameters are displayed.

In a third implementation, a computer-implemented system includes one or more computers, and one or more computer memory devices interoperably coupled with the one or more computers and having tangible, non-transitory, machine-readable media storing one or more instructions. When executed by the one or more computers, the one or more instructions perform one or more operations including generating a source wavefield and a receiver wavefield. Based on the source wavefield, a first source wavefield propagating in a first direction and a second source wavefield propagating in a second direction are generated. Based on the receiver wavefield, a first receiver wavefield propagating in the first direction and a second receiver wavefield propagating in the second direction are generated. A first seismic image is generated based on the first source wavefield and the first receiver wavefield. A second seismic image is generated based on the second source wavefield and the second receiver wavefield. A final seismic image is generated based on the first seismic image and the second seismic image.

The foregoing and other described implementations can each, optionally, include one or more of the following features:

A first feature, combinable with any of the following features, where the first source wavefield is generated by applying a Hilbert transform on the source wavefield.

A second feature, combinable with any of the previous or following features, where the final seismic image is generated by sample-by-sample multiplying the first seismic image and the second seismic image.

A third feature, combinable with any of the previous or following features, where the source wavefield and the receiver wavefield represent wave propagation for a first source location.

A fourth feature, combinable with any of the previous or following features, where the one or more operations further include generating a second source wavefield and a second receiver wavefield for a second source location. Based on the second source wavefield, a third source wavefield propagating in the first direction and a fourth source wavefield propagating in the second direction are generated. Based on the second receiver wavefield, a third receiver wavefield propagating in the first direction and a fourth receiver wavefield propagating in the second direction are generated. A third seismic image is generated based on the third source wavefield and the third receiver wavefield. A fourth seismic image is generated based on the fourth source wavefield and the fourth receiver wavefield. A second final seismic image is generated based on the first, second, third, and fourth seismic images.

A fifth feature, combinable with any of the previous features, where the final seismic image is a diffraction image indicating discontinuities in an earth subsurface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages. The computer program can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices (for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices), magnetic devices, (for example, tape, cartridges, cassettes, and internal/removable disks), magneto-optical disks, and optical memory devices (for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD)). The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component (for example, as a data server), or that includes a middleware component (for example, an application server), or that includes a front-end component (for example, a client computer having a graphical user interface or a Web browser through which a user can interact with an implementation of the subject matter described in this specification), or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, or a combination of communication networks. The communication network can communicate, for example, Internet Protocol (IP) packets, Frame Relay frames, Asynchronous Transfer Mode (ATM) cells, voice, video, or data, between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations of particular concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method, comprising:
    generating a source wavefield and a receiver wavefield associated with a subsurface;
    based on the source wavefield, generating a first source wavefield propagating in a first direction and a second source wavefield propagating in a second direction;
    based on the receiver wavefield, generating a first receiver wavefield propagating in the first direction and a second receiver wavefield propagating in the second direction;
    generating a first seismic image based on the first source wavefield and the first receiver wavefield;
    generating a second seismic image based on the second source wavefield and the second receiver wavefield; and
    multiplying the first seismic image by the second seismic image sample-by-sample to generate a diffraction based final image, wherein the diffraction based final image images diffractors and suppresses images of reflectors in the subsurface;
    displaying the diffraction based final image;
    based on the diffraction based final image, determining locations for hydrocarbon wells and determining drilling parameters for the hydrocarbon wells; and
    displaying the locations for the hydrocarbon wells and the drilling parameters.

2. The computer-implemented method of claim 1, wherein the first source wavefield is generated by applying a Hilbert transform on the source wavefield.

3. The computer-implemented method of claim 1, wherein the source wavefield and the receiver wavefield represent wave propagation for a first source location.

4. The computer-implemented method of claim 3, further comprising:
    generating a second source wavefield and a second receiver wavefield for a second source location;
    based on the second source wavefield, generating a third source wavefield propagating in the first direction and a fourth source wavefield propagating in the second direction;
    based on the second receiver wavefield, generating a third receiver wavefield propagating in the first direction and a fourth receiver wavefield propagating in the second direction;
    generating a third seismic image based on the third source wavefield and the third receiver wavefield;
    generating a fourth seismic image based on the fourth source wavefield and the fourth receiver wavefield; and generating a second final seismic image based on the first, second, third, and fourth seismic images.

5. The computer-implemented method of claim 1, wherein the diffractors comprise discontinuities in the subsurface.

6. A non-transitory, computer-readable medium storing one or more instructions executable by a computer system to perform operations comprising:
    generating a source wavefield and a receiver wavefield;
    based on the source wavefield, generating a first source wavefield propagating in a first direction and a second source wavefield propagating in a second direction;
    based on the receiver wavefield, generating a first receiver wavefield propagating in the first direction and a second receiver wavefield propagating in the second direction;
    generating a first seismic image based on the first source wavefield and the first receiver wavefield;
    generating a second seismic image based on the second source wavefield and the second receiver wavefield; and
    multiplying the first seismic image by the second seismic image sample-by-sample to generate a diffraction based final image, wherein the diffraction based final image images diffractors and suppresses images of reflectors in the subsurface;
    displaying the diffraction based final image;
    based on the diffraction based final image, determining locations for hydrocarbon wells and determining drilling parameters for the hydrocarbon wells; and
    displaying the locations for the hydrocarbon wells and the drilling parameters.

7. The non-transitory, computer-readable medium of claim 6, wherein the first source wavefield is generated by applying a Hilbert transform on the source wavefield.

8. The non-transitory, computer-readable medium of claim 6, wherein the source wavefield and the receiver wavefield represent wave propagation for a first source location.

9. The non-transitory, computer-readable medium of claim 8, further comprising:
    generating a second source wavefield and a second receiver wavefield for a second source location;
    based on the second source wavefield, generating a third source wavefield propagating in the first direction and a fourth source wavefield propagating in the second direction;
    based on the second receiver wavefield, generating a third receiver wavefield propagating in the first direction and a fourth receiver wavefield propagating in the second direction;
    generating a third seismic image based on the third source wavefield and the third receiver wavefield;
    generating a fourth seismic image based on the fourth source wavefield and the fourth receiver wavefield; and
    generating a second final seismic image based on the first, second, third, and fourth seismic images.

10. The non-transitory, computer-readable medium of claim 6, wherein the diffractors comprise discontinuities in the subsurface.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        generating a source wavefield and a receiver wavefield;
        based on the source wavefield, generating a first source wavefield propagating in a first direction and a second source wavefield propagating in a second direction;
        based on the receiver wavefield, generating a first receiver wavefield propagating in the first direction and a second receiver wavefield propagating in the second direction;
        generating a first seismic image based on the first source wavefield and the first receiver wavefield;
        generating a second seismic image based on the second source wavefield and the second receiver wavefield; and
        multiplying the first seismic image by the second seismic image sample-by-sample to generate a diffraction based final image, wherein the diffraction based final image images diffractors and suppresses images of reflectors in the subsurface;
        displaying the diffraction based final image;
        based on the diffraction based final image, determining locations for hydrocarbon wells and determining drilling parameters for the hydrocarbon wells; and
        displaying the locations for the hydrocarbon wells and the drilling parameters.

12. The computer-implemented system of claim 11, wherein the first source wavefield is generated by applying a Hilbert transform on the source wavefield.

13. The computer-implemented system of claim 11, wherein the source wavefield and the receiver wavefield represent wave propagation for a first source location.

14. The computer-implemented system of claim 13, further comprising:
    generating a second source wavefield and a second receiver wavefield for a second source location;
    based on the second source wavefield, generating a third source wavefield propagating in the first direction and a fourth source wavefield propagating in the second direction;
    based on the second receiver wavefield, generating a third receiver wavefield propagating in the first direction and a fourth receiver wavefield propagating in the second direction;
    generating a third seismic image based on the third source wavefield and the third receiver wavefield;
    generating a fourth seismic image based on the fourth source wavefield and the fourth receiver wavefield; and
    generating a second final seismic image based on the first, second, third, and fourth seismic images.

15. The computer-implemented system of claim 11, wherein the diffractors comprise discontinuities in the subsurface.

* * * * *

UNITED STATES PATENT AND TRADEMARK OFFICE
CERTIFICATE OF CORRECTION

PATENT NO. : 11,275,190 B2
APPLICATION NO. : 15/981033
DATED : March 15, 2022
INVENTOR(S) : Zhang et al.

It is certified that error appears in the above-identified patent and that said Letters Patent is hereby corrected as shown below:

On the Title Page

Item (56) OTHER PUBLICATIONS, Line 3, delete "Geoothermics" and insert -- Geothermics --.

Signed and Sealed this
Nineteenth Day of July, 2022

Katherine Kelly Vidal
*Director of the United States Patent and Trademark Office*